(12) United States Patent
Patel et al.

(10) Patent No.: US 7,081,437 B2
(45) Date of Patent: Jul. 25, 2006

(54) ENVIRONMENTALLY COMPATIBLE HYDROCARBON BLEND DRILLING FLUID

(75) Inventors: Arvind D. Patel, Sugarland, TX (US); Jim Friedheim, Spring, TX (US); John Candler, Houston, TX (US); Stephen Rabke, Houston, TX (US)

(73) Assignee: M-I L.L.C., Houston, TX (US)

( * ) Notice: Subject to any disclaimer, the term of this patent is extended or adjusted under 35 U.S.C. 154(b) by 227 days.

(21) Appl. No.: 10/647,829

(22) Filed: Aug. 25, 2003

(65) Prior Publication Data
US 2005/0054539 A1   Mar. 10, 2005

(51) Int. Cl.
C09K 8/34   (2006.01)

(52) U.S. Cl. .............. 507/103; 507/140; 507/145; 507/203; 507/269; 507/271; 507/277

(58) Field of Classification Search .................. None
See application file for complete search history.

(56) References Cited

U.S. PATENT DOCUMENTS

| | | | |
|---|---|---|---|
| 4,306,980 A | 12/1981 | Brandt et al. | 252/8.5 P |
| 4,787,990 A | 11/1988 | Boyd | 252/8.511 |
| H935 H | 7/1991 | Rines | 252/8.511 |
| 5,045,219 A | 9/1991 | Trahan et al. | 252/8.51 |
| 5,189,012 A | 2/1993 | Patel et al. | 507/103 |
| 5,254,531 A | 10/1993 | Mueller et al. | 507/131 |
| 5,432,152 A | 7/1995 | Dawson et al. | 507/103 |
| 5,559,085 A | 9/1996 | Duncan, Jr. | 507/103 |
| 5,569,642 A | 10/1996 | Lin | 507/103 |
| 5,585,333 A | 12/1996 | Dahl et al. | 507/103 |
| 5,589,442 A * | 12/1996 | Gee et al. | 507/103 |
| 5,602,083 A | 2/1997 | Gabrysch et al. | 507/200 |
| 5,635,457 A | 6/1997 | Van Slyke | 507/103 |
| 5,691,281 A | 11/1997 | Ashjian et al. | 507/103 |
| 5,741,759 A * | 4/1998 | Gee et al. | 507/103 |
| 5,869,433 A | 2/1999 | Patel | 507/103 |
| 5,888,944 A | 3/1999 | Patel | 507/110 |
| 5,905,061 A | 5/1999 | Patel | 507/129 |
| 5,909,774 A | 6/1999 | Griffith et al. | 166/312 |
| 5,909,779 A | 6/1999 | Patel et al. | 175/50 |
| 5,958,845 A | 9/1999 | Van Slyke | 507/103 |
| 5,965,783 A | 10/1999 | Gee et al. | 585/664 |
| 5,985,800 A | 11/1999 | Patel et al. | 507/129 |
| 5,994,278 A | 11/1999 | Duncan et al. | 508/485 |
| 6,034,037 A | 3/2000 | Van Slyke | 507/103 |
| 6,054,629 A | 4/2000 | Baralt et al. | 585/670 |
| 6,057,272 A * | 5/2000 | Gee et al. | 507/103 |
| 6,096,690 A | 8/2000 | Wittenbrink et al. | 507/103 |
| 6,159,906 A | 12/2000 | McNally et al. | 507/119 |
| 6,159,907 A | 12/2000 | Van Slyke | 507/203 |
| 6,165,946 A | 12/2000 | Mueller et al. | 507/203 |
| 6,187,719 B1 | 2/2001 | Dino et al. | 507/129 |
| 6,218,342 B1 | 4/2001 | Patel | 507/129 |
| 6,255,256 B1 | 7/2001 | Van Slyke | 507/103 |
| 6,308,788 B1 | 10/2001 | Patel et al. | 175/50 |
| 6,323,157 B1 * | 11/2001 | Carpenter et al. | 507/103 |
| 6,405,809 B1 | 6/2002 | Patel et al. | 175/50 |
| 6,407,302 B1 * | 6/2002 | Twu et al. | 585/670 |
| 6,410,488 B1 | 6/2002 | Fefer et al. | 507/103 |
| 6,417,142 B1 * | 7/2002 | Chatterji et al. | 507/265 |
| 6,422,326 B1 | 7/2002 | Brookey et al. | 175/72 |
| 6,514,915 B1 | 2/2003 | Beyer et al. | 507/103 |
| 6,586,372 B1 | 7/2003 | Bradbury et al. | 507/140 |
| 6,589,917 B1 | 7/2003 | Patel et al. | 507/138 |
| 6,631,764 B1 | 10/2003 | Parlar et al. | 166/278 |
| 6,649,571 B1 | 11/2003 | Morgan | 507/102 |
| 6,716,797 B1 | 4/2004 | Brookey | 507/102 |
| 6,770,602 B1 | 8/2004 | Patel et al. | 507/130 |
| 6,790,811 B1 | 9/2004 | Patel | 507/129 |
| 6,793,025 B1 | 9/2004 | Patel et al. | 175/50 |
| 6,818,595 B1 | 11/2004 | Benton et al. | 507/103 |
| 6,828,279 B1 | 12/2004 | Patel et al. | 507/136 |
| 6,838,082 B1 | 1/2005 | Growcock et al. | |
| 6,887,832 B1 | 5/2005 | Kirsner et al. | 507/103 |
| 2003/0224945 A1 * | 12/2003 | Twu et al. | 507/200 |

* cited by examiner

Primary Examiner—Robert Sellers
(74) Attorney, Agent, or Firm—Carter J. White

(57) ABSTRACT

A method of formulating and the resulting biodegradable wellbore fluid includes a first synthetic internal olefin fraction having from 16 to 18 carbon atoms ($C_{16-18}$ IO), a second synthetic internal olefin fraction having between 15 to 18 carbon atoms ($C_{15-18}$ IO), and a third synthetic internal olefin fraction having 15 to 16 carbon atoms ($C_{15-16}$ IO). The components of the wellbore fluid are blended such that the desired characteristics of polycyclic aromatic hydrocarbon content, toxicity and biodegrability are balance to achieve compliance with environmental requirements for hydrocarbon based drilling fluids. One such illustrative embodiment achieves this result by utilizing a formulation in which the first internal olefin fraction is present in a range of about 45 to about 55 percent by weight of the wellbore fluid and wherein the second internal olefin fraction is present in range of about 20 to about 30 percent by weight of the wellbore fluid and wherein the third olefin fraction is present in range of about 20 to about 30 percent by weight of the wellbore fluid. Optionally, the illustrative fluid can include a $C_{16}$ alpha olefin ($C_{16}$ AO). In such instances, the $C_{16}$ alpha olefin ($C_{16}$ AO) is present in the range of about 10 to about 20 percent by weight of the wellbore fluid.

13 Claims, No Drawings

ENVIRONMENTALLY COMPATIBLE HYDROCARBON BLEND DRILLING FLUID

BACKGROUND OF THE INVENTION

In rotary drilling there are a variety of functions and characteristics that are expected of a drilling fluid ("drilling mud" or simply "mud"). The drilling fluid is expected to carry cuttings from beneath the bit, transport them up the annulus, and permit their separation at the surface while at the same time the rotary bit is cooled and cleaned. A drilling mud is also intended to reduce friction between the drill string and the sides of the hole while maintaining the stability of uncased sections of the borehole. Likewise the drilling fluid is formulated to prevent unwanted influxes of formation fluids from permeable rocks penetrated and likewise to form a thin, low permeability filter cake, which seals pores and other openings and formations, penetrated by the bit. Finally, the drilling fluid is used to collect and interpret information available from drill cuttings, cores and electrical logs.

Drilling fluids are typically classified by the U.S. Environmental Protection Agency ("EPA") in the following manner:

"Drilling Fluid" means the circulating fluid (mud) used in the rotary drilling of wells to clean and condition the hole and to counterbalance formation pressure. Classes of drilling fluids are:

(a) "Water-Based Drilling Fluid" means the continuous phase and suspending medium for solids is a water-miscible fluid, regardless of the presence of oil.

(b) "Non-Aqueous Drilling Fluid" means the continuous phase and suspending medium for solids is a water-immiscible fluid, such as oleaginous materials (e.g., mineral oil, enhanced mineral oil, paraffinic oil, $C_{16}$–$C_{18}$ internal olefins, and $C_8$–$C_{16}$ fatty acid/2-ethylhexyl esters).

(i) "Oil-Based" means the continuous phase of the drilling fluid consists of diesel oil, mineral oil, or some other oil, but contains no synthetic material or enhanced mineral oil.

(ii) "Enhanced Mineral Oil-Based" means the continuous phase of the drilling fluid is enhanced mineral oil.

(iii) "Synthetic-Based" means the continuous phase of the drilling fluid is a synthetic material or a combination of synthetic materials.

The EPA further defines Diesel oil, Enhanced Mineral Oil and Synthetic Material in the following manner:

"Diesel Oil" refers to the grade of distillate fuel oil, as specified in the American Society for Testing and Materials Standard Specification for Diesel Fuel Oils D975-91, that is typically used as the continuous phase in conventional oil-based drilling fluids. This incorporation by reference was approved by the Director of the Federal Register in accordance with 5 U.S.C. 552(a) and 1 CFR Part 51. Copies may be obtained from the American Society for Testing and Materials, 1916 Race Street, Philadelphia, Pa. 19103. Copies may be inspected at the Office of the Federal Register, 800 North Capitol Street, NW., Suite 700, Washington, D.C. A copy may also be inspected at EPA's Water Docket, 401 M Street SW., Washington, D.C. 20460.

"Enhanced Mineral" oil as applied to enhanced mineral oil-based drilling fluid means a petroleum distillate which has been highly purified and is distinguished from diesel oil and conventional mineral oil in having a lower polycyclic aromatic hydrocarbon (PAH) content. Typically, conventional mineral oils have a PAH content on the order of 0.35 weight percent expressed as phenanthrene, whereas enhanced mineral oils typically have a PAH content of 0.001 or lower weight percent PAH expressed as phenanthrene.

"Synthetic Material" as applied to synthetic-based drilling fluid means material produced by the reaction of specific purified chemical feedstock, as opposed to the traditional base fluids such as diesel and mineral oil which are derived from crude oil solely through physical separation processes. Physical separation processes include fractionation and distillation and/or minor chemical reactions such as cracking and hydro processing. Since they are synthesized by the reaction of purified compounds, synthetic materials suitable for use in drilling fluids are typically free of polycyclic aromatic hydrocarbons (PAH's) but are sometimes found to contain levels of PAH up to 0.001 weight percent PAH expressed as phenanthrene. Internal olefins and vegetable esters are two examples of synthetic materials suitable for use by the oil and gas extraction industry in formulating drilling fluids. Internal olefins are synthesized from the isomerization of purified straight-chain (linear) hydrocarbons such as $C_{16}$–$C_{18}$ linear alpha olefins. $C_{16}$–$C_{18}$ linear alpha olefins are unsaturated hydrocarbons with the carbon to carbon double bond in the terminal position. Internal olefins are typically formed from heating linear alpha olefins with a catalyst. The feed material for synthetic linear alpha olefins is typically purified ethylene. Vegetable esters are synthesized from the acid-catalyzed esterification of vegetable fatty acids with various alcohols. EPA listed these two branches of synthetic fluid base materials to provide examples, and EPA does not mean to exclude other synthetic materials that are either in current use or may be used in the future. A synthetic-based drilling fluid may include a combination of synthetic materials.

On both offshore and inland drilling barges and rigs, drill cuttings are conveyed up the hole by a drilling fluid. Water based drilling fluids may be suitable for drilling in certain types of formations; however, for proper drilling in other formations, it is desirable to use a non-aqueous drilling fluid. With a non-aqueous drilling fluid, the cuttings, besides ordinarily containing moisture, are necessarily coated with an adherent film or layer of oleaginous drilling fluid, which may penetrate into the interior of the cuttings. This is true despite the use of various vibrating screens, mechanical separation devices and various chemical and washing techniques. Currently, in outer continental shelf waters of the U.S., cuttings drilled using diesel based and mineral oil based non-aqueous drilling fluids are prohibited from discharge and therefore require an alternate method of disposal in order to meet regulatory requirements, most of which are more expensive and more inconvenient than discharge of water based drilling fluids.

Regulations are imposed by governmental regulatory agencies concerning discharges of drilling fluids and associated cuttings. These regulations have not only made the use of diesel oil based and mineral oil based non-aqueous drilling fluid more costly but in some places difficult or impossible to use in compliance with the EPA guidelines and permits. Environmental concerns have prompted the development of a new drilling fluid. This drilling fluid is designed to meet the technology-based standards and water quality standards for discharge in compliance with EPA guidelines and Permits.

The EPA has specified protocol for meeting technology-based standards associated with discharge of cuttings associated with non-aqueous drilling fluids. These requirements can be found in the Effluent Limitation Guidelines for discharge of synthetic-based drilling mud and other non-aqueous based drilling fluids and the General permits that allow authorize discharge of synthetic-based drilling muds and other non-aqueous based drilling fluids. Detailed accounts of the procedures for measuring toxicity, biodegradation and PAH content and synthetic materials is described in the guidelines and in the permits. From the guidelines the following references are used:

Sediment toxicity: "Standard Guide for Conducting 10-day Static Sediment Toxicity Tests with Marine and Estuarine Amphipods," 1992, after preparing the sediment according to the method specified in Appendix 3 of subpart A of 40 CFR part 435. This incorporation by reference was approved by the Director of the Federal Register in accordance with 5 U.S.C. 552(a) and 1 CFR part 51. Copies may be obtained from the American Society for Testing and Materials, 100 Barr Harbor Drive, West Conshohocken, Pa., 19428. Copies may be inspected at the Office of the Federal Register, 800 North Capitol Street, NW., Suite 700, Washington, D.C. A copy may also be inspected at EPA's Water Docket, 401 M Street SW., Washington, D.C. 20460.

Biodegradation: ISO 11734:1995 (specified at § 435.11 (e)) method: "Water quality—Evaluation of the 'ultimate' anaerobic biodegradability of organic compounds in digested sludge—Method by measurement of the biogas production (1995 edition)" as modified for the marine environment (Appendix 4 of subpart A of 40 CFR part 435). This incorporation by reference was approved by the Director of the Federal Register in accordance with 5 U.S.C. 552(a) and 1 CFR part 51. Copies may be obtained from the American National Standards Institute, 11 West 42$^{nd}$ Street, 13th Floor, New York, N.Y. 10036. Copies may be inspected at the Office of the Federal Register, 800 North Capitol Street, NW., Suite 700, Washington, D.C. A copy may also be inspected at EPA's Water Docket, 401 M Street SW., Washington, D.C. 20460.

PAH: Mass (g) of PAH (as phenanthrene)/Mass (g) of stock base fluid as determined by EPA Method 1654, Revision A, (specified at § 435.11(u)) entitled "PAH Content of Oil by HPLC/UV," December 1992, which is published in Methods for the Determination of Diesel, Mineral, and Crude Oils in Offshore Oil and Gas Industry Discharges, EPA-821-R-92-008. This incorporation by reference was approved by the Director of the Federal Register in accordance with 5 U.S.C. 552(a) and 1 CFR part 51. Copies may be obtained from the National Technical Information Service, Springfield, Va. 22161, 703-605-6000. Copies may be inspected at the Office of the Federal Register, 800 North Capitol Street, NW., Suite 700, Washington, D.C. A copy may also be inspected at EPA's Water Docket, 401 M Street SW., Washington, D.C. 20460.

Also described in the guidelines the procedures for determination or synthetic-based drilling mud drilling fluid toxicity is as follows:

4-day LC50 of C16–C18 internal olefin drilling fluid/4-day LC50 of drilling fluid removed from drill cuttings at the solids control equipment as determined by ASTM E 1367-92 (specified at § 435.11(ee)) method: "Standard Guide for Conducting 10-day Static Sediment Toxicity Tests with Marine and Estuarine Amphipods," 1992, after preparing the sediment according to the method specified in Appendix 3 of subpart A of this part. This incorporation by reference was approved by the Director of the Federal Register in accordance with 5 U.S.C. 552(a) and 1 CFR part 51. Copies may be obtained from the American Society for Testing and Materials, 100 Barr Harbor Drive, West Conshohocken, Pa., 19428. Copies may be inspected at the Office of the Federal Register, 800 North Capitol Street, NW., Suite 700, Washington, D.C. A copy may also be inspected at EPA's Water Docket, 401 M Street SW., Washington, D.C. 20460.

These same procedures are further described in the EPA Region VI general permit GMG 290,000 as follows: Toxicity: Part I, Section D.8 of GMG 290000; Biodegradation: Part I, Section D.9 of GMG 290000; PAH: Part I, Section D.10 of GMG 290000

Several publications describe the use of mineral oils for low toxicity oil-based muds. However, mineral oils that were once considered to be toxicologically and environmentally superior to crude oil or diesel oil based drilling muds are now also prohibited from discharge under increasingly stringent environmental regulations. Several attempts to develop modified environmentally acceptable fluids have been made. In many instances these fluids are not true hydrocarbon fluids and require an aqueous continuous phase that does not provide desirable functional characteristics, for instance, shale stability derived with diesel oil based muds. Thus, there is a long felt need in the oil and gas exploration industry for an environmentally acceptable drilling fluid which either performs as well a diesel oil based drilling fluid has now been achieved by the present invention.

SUMMARY OF THE INVENTION

The present invention includes a biodegradable wellbore fluid that includes a first synthetic internal olefin fraction having from 16 to 18 carbon atoms, a second synthetic internal olefin fraction having between 15 and 18 carbon atoms and a third synthetic internal olefin fraction having 15–16 carbon atoms. As the term is used in this disclosure a $C_{16-18}$ internal olefin fraction is defined as having a $C_{16}$ isomer content of greater than 50% w/w and a C18 isomer content greater than 30% w/w. As the term is used in this disclosure a $C_{15-18}$ internal olefin fraction is defined as having a $C_{15}$ isomer content of greater than 20% w/w; a $C_{16}$ isomer content greater than 20%; a $C_{17}$ isomer content greater than 20%; and a $C_{18}$ isomer content greater than 15% w/w. As the term is used in this disclosure a $C_{15-16}$ internal olefin fraction is defined as having a $C_{15}$ isomer content of greater than 40% w/w and a $C_{16}$ isomer content greater than 40% w/w. As the term is used in this disclosure a $C_{16}$ alpha olefin is defined as having a $C_{16}$ isomer content of greater than 90% w/w. The fluids may contain a mixture of isomers so long as the content of the other isomers does not exceed those of the isomers that define the fluid.

The components of the illustrative wellbore fluid are blended such that the desired characteristics of toxicity and biodegrability are balanced to achieve compliance with the base stock limitation requirements for discharge. One such illustrative embodiment achieves this result by utilizing a core blend formulation in which the first internal olefin fraction is present in a range up to 70 percent by volume of the wellbore fluid and wherein the second internal olefin fraction is present in range of up to 70 percent by volume of the wellbore fluid and wherein the third olefin fraction is present in range of up to 60 percent by volume of the wellbore fluid. In addition to the first core blend, variations of the base stock blend ratios and interpolations between these blends are also included in the present invention.

| Blend ratio | $C_{16}$–$C_{18}$ | $C_{15}$–$C_{18}$ | $C_{15}$–$C_{16}$ |
| --- | --- | --- | --- |
| Core | 50 | 25 | 25 |
| 1 | 25 | 50 | 25 |
| 2 | 25 | 25 | 50 |

-continued

| Blend ratio | $C_{16}$–$C_{18}$ | $C_{15}$–$C_{18}$ | $C_{15}$–$C_{16}$ |
|---|---|---|---|
| 3 | 30 | 70 | 0 |
| 4 | 70 | 30 | 0 |
| 5 | 60 | 0 | 40 |
| 6 | 40 | 0 | 60 |

Optionally, the illustrative fluid can include a $C_{16}$ alpha olefin. In such instances, the core blend and associated variations and interpolations between variations would be as follows

| Blend ratio variation | $C_{16}$–$C_{18}$ | $C_{15}$–$C_{18}$ | $C_{15}$–$C_{16}$ | $C_{16}$ |
|---|---|---|---|---|
| Core | 50 | 20 | 15 | 15 |
| 1 | 50 | 30 | 10 | 10 |
| 2 | 50 | 15 | 20 | 15 |
| 3 | 50 | 10 | 30 | 10 |
| 4 | 60 | 20 | 10 | 10 |
| 5 | 40 | 20 | 20 | 20 |
| 6 | 70 | 30 | 0 | 0 |

$C_{16}$ alpha olefin is present at up to 20 percent by volume of the base fluid in the core blend. A person of skill in the art should understand and appreciate that the illustrative well bore fluid may further include a non-oleaginous phase, typically as an internal phase. By doing so a non-aqueous drilling fluid is preferably formed. When included the non-oleaginous phase constitutes from about 1% to about 70% by volume of said fluid. Such a non-oleaginous phase may be selected from fresh water, seawater, a brine containing organic or inorganic dissolved salts, a liquid containing water-miscible organic compounds, and combinations thereof. The fluids of the present invention may further contain additional components depending upon the end use of the non-aqueous drilling fluid so long as they do not adversely impact the toxicity of the fluids described herein to a point which they can no longer meet the toxicity requirements in the Guidelines and the General Permit. For example, alkali reserve, wetting agents, organophillic clays, viscosifiers, weighting agents, bridging agents and fluid loss control agents may be added to the fluid compositions of this invention for additional functional properties. The addition of such agents should be well known to one of skill in the art of formulating drilling fluids and muds. When included the weighting agent is selected from the group including calcium carbonate, dolomite, siderite, barite, celestite, iron oxides, manganese oxides, ulexite, carnalite, sodium chloride and combinations thereof and similar such weighting agents known in the art.

Alternatively, the present invention is considered to be a method of formulating the continuous phase of a hydrocarbon based drilling fluid. In one such illustrative embodiment, the method includes: determining the toxicity of a selection of hydrocarbon components; determining the biodegradability of the selection of hydrocarbon components determining the PAH contents of the hydrocarbon components; and blending the selection hydrocarbon components in a manner which produces a hydrocarbon based drilling fluid that consistently passes with a score of $\leq 1$ using the "10-day Static Sediment Toxicity Tests with Marine and Estuarine Amphipods," as disclosed in the guidelines and the general permits including GMG290000 and consistently passes with a biodegradation rate ratio $\leq 1$ using the modified ISO 11734 test described in the guidelines and the permit. The selection of hydrocarbons in the illustrative embodiment is preferably from the group including a first synthetic internal olefin having from 16 to 18 carbon atoms, a second synthetic internal olefin having from 15 to 18 carbon atoms; a third synthetic internal olefin having from 15 to 16 carbon atoms and an alpha olefin having 16 carbon atoms. That is to say, another illustrative embodiment of the present invention includes a method comprising blending a first synthetic internal olefin having from 16 to 18 carbon atoms, a second synthetic internal olefin having from 15 to 18 carbon atoms and a third synthetic internal olefin having from 15 to 16 carbon atoms to form said biodegradable wellbore fluid. In either instance, the inventive method may include blending an alpha olefin having 16 carbon atoms.

The present invention includes as an illustrative embodiment a method of drilling a subterranean well. Such an illustrative embodiment includes attaching a cutting bit to a length of drill pipe, rotating said cutting bit, removing cuttings from around said bit with a drilling fluid. The illustrative method utilizes a wellbore fluid as is substantially disclosed herein. In a preferred embodiment, the wellbore fluid includes a first synthetic internal olefin having from 16 to 18 carbon atoms, a second synthetic internal olefin having from 15 to 18 carbon atoms and a third synthetic internal olefin having from 15 to 16 carbon atoms.

DESCRIPTION OF ILLUSTRATIVE EMBODIMENTS

The present invention is generally directed to the continuous phase of a non-aqueous drilling fluid that uses a synthetic material as the continuous phase.

The present invention is generally directed to a synthetic material well bore fluid that has a balance of properties including toxicity and biodegradability as well as meeting PAH limitations. The synthetic material based well bore fluid is useful in the formulation of drilling, completing and working over of subterranean wells, preferably oil and gas wells. The fluids of the present invention may also be used as packing fluids, fracturing fluids and other similar well bore uses in which the properties of biodegradability and low toxicity as well as lack of priority pollutants are desired. The fluids of the present invention may also be used to formulate Non-Aqueous Drilling Fluids. Uses of the well bore fluids and non-aqueous drilling fluid should be known to one of skill in the art as is noted in the book COMPOSITION AND PROPERTIES OF DRILLING AND COMPLETION FLUIDS, 5th Edition, H. C. H. Darley and George R. Gray, Gulf Publishing Company, 1988, the contents of which are hereby incorporated herein by reference.

An oleaginous fluid is a liquid and more preferably is a synthetic material and more preferably the oleaginous fluid is selected from the group including synthetic internal olefin fractions, synthetic alpha olefin fraction and mixtures thereof. The concentration of the oleaginous fluid should be sufficient so that an invert emulsion forms and may be less than about 99% by volume of the non-aqueous drilling fluid emulsion. In one embodiment the amount of oleaginous fluid is from about 30% to about 95% by volume and more preferably about 40% to about 90% by volume of the non-aqueous drilling fluid. The oleaginous fluid in one embodiment includes a mixture of synthetic internal olefin fractions and in another alternative illustrative embodiment the mixture includes alpha fractions in addition to the mixture of synthetic internal fractions. As is illustrated below, such a combination of synthetic internal fractions and optionally alpha olefin results in a drilling fluid having a desirable balance of toxicity and biodegradability. Specifically, in one illustrative core blend embodiment a mixture of a synthetic $C_{16}$–$C_{18}$ internal olefin fraction; a synthetic $C_{15}$–$C_{18}$ internal olefin fraction; a synthetic $C_{15}$–$C_{16}$ internal olefin fraction has been found to consistently meet the environmental standards for use in the Gulf of Mexico. This consistency of passing the toxicity and biodegradation tests provides a higher level of compliance assurance in contrast to the performance of the individual products which suffer greater variability due to testing artifacts and manufacturing inconsistencies. In another illustrative core blend embodiment, a mixture of a synthetic $C_{16}$–$C_{18}$ internal olefin fraction; a synthetic $C_{15}$–$C_{18}$ internal olefin fraction; a synthetic $C_{15}$–$C_{16}$ internal olefin fraction and a $C_{16}$ alpha olefin has been found to consistently meet the environmental standards for use in the Gulf of Mexico and Effluent Limitation Guidelines. This results in an oleaginous fluid having a balance of toxicity and biodegradability properties as well as meeting the PAH limitations required by the Effluent Limitation Guidelines and the general permits including GMG290000. Specifically, in the second illustrative core blend embodiment a mixture of a synthetic $C_{16}$–$C_{18}$ internal olefin fraction; a synthetic $C_{15}$–$C_{18}$ internal olefin fraction; a synthetic $C_{15}$–$C_{16}$ internal olefin fraction and a $C_{16}$ alpha olefin has been found to consistently meet the environmental standards for use in the Gulf of Mexico. This consistency of passing the toxicity and biodegradation tests provides a higher level of compliance assurance in contrast to the performance of the individual products which suffer greater variability due to testing artifacts and manufacturing inconsistencies The present invention also discloses a method of formulating a drilling fluid by first determining the toxicity and biodegradability of the components, and balancing the toxicity and biodegradability of the individual components, for example internal olefins (IO) and/or alpha-olefins (AOs), and then blending them to achieve the desired result. In pursing the methods of the present invention as applied to aliphatic hydrocarbons, it has been discovered that generally as the molecular weight of the hydrocarbon increases, the hydrocarbon becomes less toxic but also become less biodegradable. The opposite is also true, the lower molecular weight, the hydrocarbon becomes more toxic, but also more biodegradable. Thus we have discovered that it is necessary to balance the blend of hydrocarbons, principally internal olefins and alpha-olefins, to achieve a high molecular weight fluid with good biodegradability and low toxicity. The balance of biodegradability and toxicity occurs in a context of also meeting the PAH requirements of the base stock limitations.

In an illustrative embodiment of the present invention, three different internal olefin fractions (IO s) were tested and utilized: $C_{16}$–$C_{18}$ internal olefin fraction (the first internal olefin fraction, also refered to as the $C_{16\text{-}18}$ IO), $C_{15}$–$C_{18}$ internal olefin fraction (the second internal olefin fraction), and $C_{15}$–$C_{16}$ internal olefin fraction (the third internal olefin fraction). Additionally, a $C_{16}$ alpha-olefin fraction (AO) was tested and optionally was added to the mixture of internal olefins. As noted above, we have discovered that biodegradability generally increases in the following order: $C_{16}$–$C_{18}$ internal olefin fraction; $C_{15}$–$C_{18}$ internal olefin fraction; $C_{15}$–$C_{16}$ internal olefin fraction; and $C_{16}$ alpha-olefin having the highest biodegradability. In contrast, testing of the toxicity generally has the opposite order with $C_{16}$–$C_{18}$ internal olefin fraction having the lowest toxicity; $C_{15}$–$C_{18}$ internal olefin fraction; $C_{16}$ alpha-olefin fraction and $C_{15}$–$C_{16}$ internal olefin fraction having the highest toxicity.

As described above, none of the fluids by itself possesses the balance of high biodegradability and low toxicity achievable by the fluids of the present invention. However, we have found that a blend of the three internal olefins and optionally the alpha-olefin produce fluids that balance biodegradability and low toxicity.

The following Table 1 shows the typical compositions of the synthetic hydrocarbons utilized in a preferred illustrative embodiment:

TABLE 1

|  | $C_{16}$–$C_{18}$ IO | $C_{15}$–$C_{18}$ IO | $C_{15}$–$C_{16}$ IO | $C_{16}$ AO |
|---|---|---|---|---|
| $C_{14}$ Isomers | 0.6 | 2.7 | 3.6 | 1.1 |
| $C_{15}$ Isomers | 1.0 | 23.2 | 48.1 | 0.5 |
| $C_{16}$ Isomers | 55.1 | 25.4 | 43.3 | 94.6 |
| $C_{17}$ Isomers | 2.1 | 24.0 | 4.9 | 0.3 |
| $C_{18}$ Isomers | 33.0 | 19.7 | 0.0 | 3.4 |
| $C_{19}$ Isomers | 1.6 | 5.0 | 0.0 | 0.0 |
| $C_{20}$ Isomers | 6.6 | 0.0 | 0.0 | 0.1 |

All values are in % (w/w).

As the term is used in this disclosure a $C_{16\text{-}18}$ internal olefin fraction (the first internal olefin fraction, also referred to as the $C_{16\text{-}18}$ IO) is defined as having a $C_{16}$ isomer content of greater than 50% w/w and a $C_{18}$ isomer content greater than 30% w/w. As the term is used in this disclosure a $C_{15\text{-}18}$ internal olefin fraction (the second internal olefin fraction, also referred to as the $C_{15\text{-}18}$ IO) is defined as having a $C_{15}$ isomer content of greater than 20% w/w; a $C_{16}$ isomer content greater than 20%; a $C_{17}$ isomer content greater than 20%; and a $C_{18}$ isomer content greater than 15% w/w. As the term is used in this disclosure a $C_{15\text{-}16}$ internal olefin fraction (the third internal olefin fraction, also referred to as the $C_{15\text{-}16}$ IO) is defined as having a $C_{15}$ isomer content of greater than 40% w/w and a $C_{16}$ isomer content greater than 40% w/w. As the term is used in this disclosure a $C_{16}$ alpha olefin fraction (also referred to as the $C_{16}$ AO) is defined as having a $C_{16}$ isomer content of greater than 90% w/w. As indicated in the table above the fluid may contain a mixture of isomers so long as the content of the other isomers does not exceed those of the isomers that define the fluid.

In the following Table 2, the following mixtures of formulated base fluids have been included as being illustrative of the base fluids of the present invention:

Sample E—30% internal olefin #1 ($C_{16\text{-}18}$ IO); 40% internal olefin #2 ($C_{15\text{-}18}$ IO), 30% internal olefin #3 ($C_{15\text{-}16}$ IO), Sample F—50% internal olefin #1 ($C_{16\text{-}18}$ IO) and 50% E Sample G—60% internal olefin #1 ($C_{16\text{-}18}$ IO) and 40% E Sample H—40% internal olefin #1 ($C_{16\text{-}18}$ IO) and 60% E

TABLE 2

|  | E | F | G | H |
|---|---|---|---|---|
| $C_{14}$ Isomers | 2.6 | 1.7 | 1.5 | 1.9 |
| $C_{15}$ Isomers | 23.8 | 12.4 | 10.0 | 14.6 |
| $C_{16}$ Isomers | 52.1 | 53.6 | 54.2 | 52.9 |
| $C_{17}$ Isomers | 11.2 | 7.1 | 6.2 | 7.9 |
| $C_{18}$ Isomers | 8.8 | 20.4 | 22.8 | 18.6 |
| $C_{19}$ Isomers | 1.6 | 1.4 | 1.3 | 1.4 |
| $C_{20}$ Isomers | 0.0 | 3.4 | 4.0 | 2.7 |

All values are in % (w/w).

As the term is utilized in this disclosure, a three-component blend of hydrocarbons that are illustrative of the present invention comprises about 45% wt/wt to about 55% wt/wt of a $C_{16}$–$C_{18}$ internal olefin fraction (internal olefin #1, $C_{16-18}$ IO), about 20% wt/wt to about 30% wt/wt of a $C_{15}$–$C_{18}$ internal olefin fraction (internal olefin #2, $C_{15-18}$ IO), and about 20% wt/wt to about 30% wt/wt of a $C_{15}$–$C_{16}$ internal olefin fraction (internal olefin #3, $C_{15-16}$ IO). A preferred blend comprises about 47% wt/wt to about 53% wt/wt internal olefin #1 ($C_{16-18}$ IO), about 22% wt/wt to about 28% wt/wt internal olefin #2 ($C_{15-18}$ IO), and about 22% wt/wt to about 28% wt/wt internal olefin #3 ($C_{15-16}$ IO). A more preferred blend comprises about 50% wt/wt internal olefin #1 ($C_{16-18}$ IO), about 25% wt/wt internal olefin #2 ($C_{15-18}$ IO), and about 25% wt/wt internal olefin #3 ($C_{15-16}$ IO).

As the term is utilized in this disclosure, a four-component blend of hydrocarbons that is illustrative of the present invention comprises about 45 to about 55% internal olefin #1 ($C_{16-18}$ IO), about 15 to about 25% internal olefin #2 ($C_{15-18}$ IO), about 10 to about 20% internal olefin #3 ($C_{15-16}$ IO), and about 10 to about 20% $C_{16}$ alpha-olefin ($C_{16}$ AO). A preferred blend comprises about 47 to about 53% internal olefin #1 ($C_{16-18}$ IO), about 17 to about 23% internal olefin #2 ($C_{15-18}$ IO), about 12 to about 18% internal olefin #3 ($C_{15-16}$ IO), and about 12 to about 18% $C_{16}$ alpha-olefin ($C_{16}$ AO). A more preferred blend comprises about 50% internal olefin #1 ($C_{16-18}$ IO), about 20% internal olefin #2 ($C_{15-18}$ IO), about 15% internal olefin #3 ($C_{15-16}$ IO), and about 15% $C_{16}$ alpha-olefin ($C_{16}$ AO).

The drilling fluid of the present invention may optionally contain a non-oleaginous phase. The components of the non-oleaginous phase include, but not limited to, fresh water, seawater, a brine containing organic or inorganic dissolved salts, a liquid containing water-miscible organic compounds, and combinations thereof. The non-oleaginous phase comprises from about 1 to about 70 by volume of the drilling fluid.

Various emulsifiers may be added to the drilling fluids of the present invention. The emulsifiers are chemical compounds that have both oleophilic and hydrophilic parts. The emulsifiers that have demonstrated utility in the emulsions of this invention are fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Blends of these materials as well as other emulsifiers can be used for this application.

A rheology control agent, such as those disclosed in co-pending application entitled: "OIL BASED DRILLING FLUID AND INVERT EMULSION HAVING A FLAT RHEOLOGY" may be utilized to flatten the rheological characteristics of the drilling fluid over a wide temperature range (i.e. from 40° F. to 150° F.). In one illustrative embodiment, the rheology modifier is a poly-carboxylic acid of a fatty acid. More preferably the poly-carboxylic acid is trimeric and therefore at least three carboxyl groups in the molecule, and more preferably the trimeric poly-carboxylic acid is derived from tall oil or other similar unsaturated long chain carboxylic acids (i.e. fatty acids). A particularly preferred embodiment is commercially available from M-I, of Houston Tex. as EMI-755. In another illustrative embodiment of the present invention, the rheology modifier is a proprietary polyamide based rheology modifier based on a mixture of amides and amines commercially available from M-I of Houston Tex. as EMI-756. The concentration of the rheology modifier should be sufficient to achieve the results of the present invention. In one illustrative embodiment in which the rheology modifier is a trimeric poly-carboxylic acid of tall oil, the concentration may range from 0.1 to 5 pounds per barrel of drilling fluid and more preferably is from about 0.5 to 2 pounds per barrel of fluid.

The method used in preparing the drilling fluids of the present invention is not critical. Conventional methods can be used to prepare the drilling fluids of the present invention in a manner analogous to those normally used, to prepare conventional oil-based drilling fluids. In one representative procedure, a desired quantity of oleaginous fluid such as a base stock that meets environmental regulatory requirement and a suitable amount of the primary emulsifier are mixed together followed by the rheology modifying agent and the remaining components are added with continuous mixing. non-aqueous drilling fluid based on this fluid may be formed by vigorously agitating, mixing or shearing the oleaginous fluid with a non-oleaginous fluid.

The fluids of the present invention may further contain additional components depending upon the end use of the non-aqueous drilling fluids so long as they do not adversely impact the toxicity and biodegradability of the fluids described herein. For example, alkali reserve, wetting agents, organophillic clays, viscosifiers, weighting agents, bridging agents and fluid loss control agents may be added to the fluid compositions of this invention for additional functional properties. The addition of such agents should be well known to one of skill in the art of formulating drilling fluids and muds.

Wetting agents that may be suitable for use in this invention include, crude tall oil, oxidized crude tall oil, organic phosphate esters, modified imidazolines and amidoamines, alkyl aromatic sulfates and sulfonates, and the like, and combinations or derivatives of these. Versawet® and Versawet®NS are examples of commercially available wetting agents manufactured and distributed by M-I L.L.C. that may be used in this invention. Silwet L-77, L-7001, L7605 and L-7622 are examples of commercially available surfactants and wetting agents manufactured and distributed by Union Carbide Chemical Company Inc.

Organophillic clays, normally amine treated clays, may be useful as viscosifiers in the fluid compositions of the present invention. The amount of organophillic clay used in the composition should be minimized to avoid an adverse effect upon the rheological properties of the present inventive drilling fluids. However, normally about 0.1% to 10% by weight range are sufficient for most applications. VG-69 and VG-PLUS are organo-clay materials distributed by M-I L.L.C., and Versa-HRP is a polyamide resin material manufactured and distributed by M-I L.L.C., that may be used in this invention.

Weighting agents or density materials suitable for use in this invention include galena, hematite, magnetite, iron oxides, illmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives that do not cause the drilling fluid to fail the RPE test identified in the guidelines and the permit.

Typically, fluid loss control agents are added in amounts less than about 10% and preferably less than about 5% by weight of the fluid.

The following examples are included to demonstrate preferred embodiments of the invention. It should be appreciated by those of skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

GENERAL INFORMATION RELEVANT TO THE EXAMPLES

These tests were conducted in accordance with the procedures in API Bulletin RP 13B-2, 1990. The following abbreviations are sometimes used in describing the results of experimentation.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"AV" is apparent viscosity which is another variable used in the calculation of viscosity characteristic of drilling fluid, measured in centipoise (cp) units.

"GELS" is a measure of the suspending characteristics, or the thixotripic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss, measured in milliliters (ml) according to API bulletin RP 13 B-2, 1990.

"Mwt." is the mud weight in pounds per gallon.

The following products are utilized in the following illustrative examples. These products are commercially available and to the extent know are described.

"LAMGREEN P1" is a fatty acid ester based primary surfactant available from Lamberti Chemical of Milano, Italy "LAMGREEN S1" is a supplemental emulsion with an fatty acid ester base available from Lamberti Chemical of Milano, Italy "MI BAR" is crushed, sieved and sized barite weighting agent available from M-I, Inc., Houston, Tex.

"VG+" is an organophillic clay viscosity agent available from M-I, Inc., Houston, Tex.

"Benton 990" is an organophillic clay viscosity agent available from M-I, Inc., Houston, Tex.

"VG Supreme" is an organophillic clay viscosity agent available from M-I, Inc., Houston, Tex.

"EMI-715" is an organophillic clay rheology agent available from M-I, Inc., Houston, Tex.

"VERSA HRP" is a polyamide viscosifier available from M-I, Inc., Houston, Tex.

"VERSA EMUL-2" is an amidoamine emulsifier available from M-I, Inc., Houston, Tex.

"EMI-526" is a resin based fluid loss control agent available from M-I, Inc., Houston, Tex.

"EMI-595" is an amidoamine emulsifier available from M-I, Inc., Houston, Tex.

"EMI-157" is an oleic acid based wetting agent and can be used as a secondary emulsifier available from M-I, Inc., Houston, Tex.

"EMI-755" is a trimer acid based rheology modifier available from M-I, Inc., Houston, Tex.

"EcoTrol" is a fluid loss control agent and is available from M-I, Inc., Houston, Tex.

The following examples illustrate drilling fluid formulations and their suitability for drilling subterranean wells.

Example 1

Three-Component Blend

In this example a three component base drilling fluid was utilized in the formulation of an invert emulsion drilling fluid (Mud A). Simulated drilling solids (OCMA clay) were added to invert emulsion to achieve Mud B. The following table provides representative formulation information for each test fluid.

|  | Mud Formulation | |
| --- | --- | --- |
|  | A | B |
| IO C$_{16-18}$, ml | 98 | 98 |
| IO C$_{15-18}$, ml | 49 | 49 |
| IO C$_{15-16}$, ml | 49 | 49 |
| VG+, ppb | 1.0 | 1.0 |
| Lime, ppb | 3.0 | 3.0 |
| EMI-595, ppb | 7 | 7 |
| EMI-157, ppb | 3 | 3 |
| EMI-755, ppb | 2 | 2 |
| 25% CaCl$_2$ brine, ml | 70.8 | 70.8 |
| Barite, ppb | 290 | 290 |
| EcoTrol, ppb | 0.5 | 0.5 |
| OCMA, ppb | — | 35 |

The rheological properties of both the base invert emulsion (mud A) and the base invert emulsion including simulated drilling cuttings were determined both prior to and after hot rolling for about 16 hours at about 150° F.

Barite sag control was tested using a sag flow loop tester. About 2.8 gallons of the test mud is circulated in the flow loop consisting of a plastic test tube (2" ID×6' long), a circulating pump, and a densitometer. The plastic tube can be adjusted at angles varying from vertical (0-degree) to horizontal (90-degree). Inside the plastic tube, a steel rod is used to simulate drill string and can be rotated at speeds varying from 0 to 225 rpm. For barite sag evaluation, the test normally is conducted at 60-degree inclination with varying pump rates (from 25 to 185 fpm annular velocity) and pipe rotations (from 0 to 225 rpm). Changes of mud weight due to sagging/settling of barite or other weighting agent in the test tube are determined by the densitometer under circulating conditions. After the sag test, the mud weight data were corrected to a constant temperature of 120F for comparison.

The following table provides representative data for the base invert emulsion (mud A).

| Mud A | | | | | | |
|---|---|---|---|---|---|---|
| Mud Properties | | | | | | |
| Mud Weight, ppg | 13.0 | | | 13.0 | | |
| Synthetic/Water Ratio | 75/25 | | | 75/25 | | |
| | Before Hot Rolling | | | After Hot Rolling @150° F. | | |
| Rheo Temp, ° F. | 40 | 100 | 150 | 40 | 100 | 150 |
| 600 rpm | 73 | 53 | 40 | 140 | 63 | 46 |
| 300 rpm | 42 | 30 | 23 | 84 | 35 | 29 |
| 200 rpm | 33 | 23 | 17 | 61 | 28 | 22 |
| 100 rpm | 21 | 15 | 11 | 36 | 19 | 16 |
| 6 rpm | 6 | 5 | 5 | 9 | 8 | 9 |
| 3 rpm | 5 | 4 | 4 | 7 | 7 | 8 |
| PV, cps | 31 | 23 | 17 | 56 | 28 | 17 |
| YP, lbs/100 ft$^2$ | 11 | 7 | 6 | 28 | 7 | 12 |
| 10 Second Gel | 7 | 6 | 6 | 14 | 13 | 12 |
| 10 Minute Gel | 9 | 8 | 8 | 20 | 23 | 18 |
| Total HTHP@250° F., cc | | | | | | |
| E.S. @ 150° F., Volts | 255 | | | 436 | | |
| SAG TEST @150° F. | — | | | 2.8 | | |
| VST, ppg | | | | | | |

The following table provides representative data for the base invert emulsion with the addition of 35 pounds per barrel (ppb) of OCMA clay a simulated drilling solids material (mud B).

| Mud B (Base fluid (Mud A) plus 35 ppb simulated drilling solids) | | | | | | |
|---|---|---|---|---|---|---|
| Mud Properties | | | | | | |
| Mud Weight, ppg | 13.0 | | | 13.0 | | |
| Synthetic/Water Ratio | 75/25 | | | 75/25 | | |
| | Before Hot Rolling | | | After Hot Rolling @150° F. | | |
| RheoTemp, ° F. | 40 | 100 | 150 | 40 | 100 | 150 |
| 600 rpm | 134 | 104 | 77 | 211 | 99 | 74 |
| 300 rpm | 84 | 69 | 50 | 125 | 61 | 52 |
| 200 rpm | 67 | 55 | 42 | 92 | 48 | 45 |
| 100 rpm | 48 | 41 | 32 | 57 | 34 | 36 |
| 6 rpm | 23 | 21 | 17 | 18 | 20 | 27 |
| 3 rpm | 22 | 19 | 17 | 16 | 20 | 25 |
| PV, cps | 50 | 35 | 27 | 86 | 38 | 22 |
| YP, lbs/100 ft$^2$ | 34 | 34 | 23 | 39 | 23 | 30 |
| 10 Second Gel | 23 | 22 | 18 | 23 | 29 | 29 |
| 10 Minute Gel | 32 | 29 | 28 | 49 | 43 | 37 |
| Total HTHP@250° F., cc | | | | | | |
| E.S. @ 150° F., Volts | 679 | | | 880 | | |
| SAG TEST @150° F. | 2.8 | | | 0.13 | | |
| VST, ppg | | | | | | |

Upon review of the above data, one of skill in the art should understand and appreciate that fluids formulated in accordance with the present invention are suitable for use as a non-aqueous drilling fluid in the drilling of subterranean wells.

Example 2

Four Component Blend

In this example a four component base drilling fluid was utilized in the formulation of a non-aqueous drilling fluid (Mud C). Simulated drilling solids (OCMA clay) were added to non-aqueous drilling fluid to achieve Mud D. The following table provides representative formulation information for each test fluid.

| | Fluid Formulation | |
|---|---|---|
| | C | D |
| IO C$_{16-18}$, ppb | 77.12 | 77.12 |
| IO C$_{15-18}$, ppb | 30.85 | 30.85 |
| IO C$_{15-16}$, ppb | 23.13 | 23.13 |
| AO C$_{16}$, ppb | 23.13 | 23.13 |
| VG+, ppb | 2.0 | 2.0 |
| Lime, ppb | 3.0 | 3.0 |
| Lamgreen P1, ppb | 7 | 7 |
| Lamgreen S1, ppb | 2 | 2 |
| 25% CaCl$_2$ brine, ppb | 87.1 | 87.1 |
| EMI-526 | 1 | 1 |
| MI BAR, ppb | 289.15 | 289.15 |
| OCMA, ppb | — | 35 |

The rheological properties of both the base invert emulsion (mud C) and the base non-aqueous drilling fluid including simulated drilling cuttings (Mud D) were determined after hot rolling for about 16 hours at about 150° F. The following table provides representative data for both formulations.

| Mud Properties | C | | | D | | |
|---|---|---|---|---|---|---|
| Heat aging Temp. ° F. | 150 | | | 150 | | |
| Heat Aging Time Hrs. | 16 | | | 16 | | |
| Static/Rolling | Rolling | | | Rolling | | |
| Mud Weight, ppg | 13.0 | | | 13.0 | | |
| Synthetic/Water Ratio | 75/25 | | | 75/25 | | |
| Rheo Temp, ° F. | 40 | 100 | 150 | 40 | 100 | 150 |
| 600 rpm | 124 | 54 | 39 | 160 | 76 | 55 |
| 300 rpm | 77 | 35 | 26 | 94 | 45 | 35 |
| 200 rpm | 58 | 24 | 16 | 71 | 32 | 23 |
| 100 rpm | 39 | 16 | 11 | 46 | 21 | 15 |
| 6 rpm | 13 | 6 | 5 | 13 | 7 | 5 |
| 3 rpm | 11 | 5 | 4 | 10 | 5 | 4 |
| PV, cps | 47 | 19 | 13 | 66 | 31 | 20 |
| YP, lbs/100 ft$^2$ | 30 | 16 | 13 | 28 | 14 | 15 |
| 10 Second Gel | 13 | 6 | 5 | 14 | 7 | 6 |
| 10 Minute Gel | 14 | 7 | 6 | 15 | 8 | 8 |
| Total HTHP@250° F., cc | | | | | | |
| E.S. @ 150° F., Volts | 684 | | | 796 | | |
| SAG TEST @150° F. | 12.917 | | | 13.334 | | |
| Initial Mwt. ppg | | | | | | |
| Bottom Mwt, ppg | 16.000 | | | 15.459 | | |
| Top Mwt, ppg | 11.584 | | | 11.834 | | |
| VST, ppg | 3.083 | | | 2.212 | | |

Upon review of the above data one of skill in the art should understand and appreciate that the above fluid formulations are suitable for drilling subterranean wells. Further it should be noted that no barite settling was observed after cooling down to room temperature.

Example 3

Rheology Modifiers

In this example a four component base drilling fluid was utilized in the formulation of a non-aqueous drilling fluid (Mud C) but also including a rheology agent. Simulated drilling solids (OCMA clay) were added to the non-aqueous drilling fluid The following table provides representative formulation information for each test fluid.

| | Fluid Formulation | | | |
|---|---|---|---|---|
| | E Base | F Mud C & EMI-715 | G Mud C & Emul-2 | H Mud C & Versa HRP |
| IO $C_{16-18}$, ppb | 77.12 | 77.12 | 77.12 | 77.12 |
| IO $C_{15-18}$, ppb | 30.85 | 30.85 | 30.85 | 30.85 |
| IO $C_{15-16}$, ppb | 23.13 | 23.13 | 23.13 | 23.13 |
| AO $C_{16}$, ppb | 23.13 | 23.13 | 23.13 | 23.13 |
| VG+, ppb | 2.0 | 2.0 | 2.0 | 2.0 |
| Lime, ppb | 3.0 | 3.0 | 3.0 | 3.0 |
| Lamgreen P1, ppb | 7 | 7 | 7 | 7 |
| Lamgreen S1, ppb | 2 | 2 | 2 | 2 |
| 25% $CaCl_2$ brine, ppb | 87.1 | 87.1 | 87.1 | 87.1 |
| EMI-526 | 1 | 1 | 1 | 1 |
| MI BAR, ppb | 289.15 | 289.15 | 289.15 | 289.15 |
| Rheology Agent, ppb | — | 0.5 | 1.5 | 1.0 |

The rheological properties of both the non-aqueous drilling fluids (Muds E, F and G) and the base non-aqueous drilling fluid including simulated drilling cuttings (Muds E', F' and G') were determined after hot rolling for about 16 hours at about 150° F. The following tables provide representative data.

| Mud Properties | Mud E | | | Mud E' (25 ppb OCMA clay) | | |
|---|---|---|---|---|---|---|
| Heat aging Temp. ° F. | 150 | | | 150 | | |
| Heat Aging Time Hrs. | 16 | | | 16 | | |
| Static/Rolling | Rolling | | | Rolling | | |
| Mud Weight, ppg | 13.0 | | | 13.0 | | |
| Synthetic/Water Ratio | 75/25 | | | 75/25 | | |
| Rheo Temp, ° F | 40 | 100 | 150 | 40 | 100 | 150 |
| 600 rpm | 155 | 74 | 55 | 170 | 84 | 64 |
| 300 rpm | 90 | 46 | 36 | 98 | 53 | 44 |
| 200 rpm | 66 | 35 | 26 | 73 | 42 | 34 |
| 100 rpm | 42 | 33 | 19 | 47 | 27 | 25 |
| 6 rpm | 13 | 11 | 10 | 16 | 12 | 12 |
| 3 rpm | 11 | 10 | 9 | 13 | 11 | 11 |
| PV, cps | 65 | 28 | 19 | 72 | 31 | 20 |
| YP, lbs/100 ft$^2$ | 25 | 18 | 17 | 26 | 22 | 24 |
| 10 Second Gel | 16 | 13 | 13 | 18 | 17 | 14 |
| 10 Minute Gel | 21 | 19 | 20 | 28 | 25 | 22 |
| Total HTHP@250° F., cc | | | | | | |
| E.S. @ 150° F., Volts | 765 | | | 810 | | |
| SAG TEST @150° F. | 13.292 | | | 13.375 | | |
| Initial Mwt. Ppg | | | | | | |
| Bottom Mwt, ppg | 15.209 | | | 14.584 | | |
| Top Mwt, ppg | 11.584 | | | — | | |
| VST, ppg | 1.917 | | | 1.208 | | |

| Mud Properties | Mud F | | | Mud F' (25 ppb OCMA clay) | | |
|---|---|---|---|---|---|---|
| Heat aging Temp. ° F. | 150 | | | 150 | | |
| Heat Aging Time Hrs. | 16 | | | 16 | | |
| Static/Rolling | Rolling | | | Rolling | | |
| Mud Weight, ppg | 13.0 | | | 13.0 | | |
| Synthetic/Water Ratio | 75/25 | | | 75/25 | | |
| Rheo Temp, ° F | 40 | 100 | 150 | 40 | 100 | 150 |
| 600 rpm | 149 | 72 | 54 | 182 | 89 | 69 |
| 300 rpm | 92 | 47 | 38 | 107 | 57 | 48 |
| 200 rpm | 71 | 34 | 28 | 80 | 46 | 37 |
| 100 rpm | 47 | 24 | 21 | 52 | 32 | 27 |
| 6 rpm | 16 | 12 | 11 | 18 | 16 | 16 |
| 3 rpm | 14 | 11 | 10 | 16 | 14 | 14 |
| PV, cps | 57 | 25 | 16 | 75 | 32 | 21 |
| YP, lbs/100 ft$^2$ | 35 | 22 | 22 | 32 | 25 | 27 |
| 10 Second Gel | 19 | 15 | 11 | 22 | 21 | 18 |
| 10 Minute Gel | 28 | 21 | 16 | 38 | 29 | 24 |
| Total HTHP@250° F., cc | | | | | | |
| E.S. @ 150° F., Volts | 694 | | | 804 | | |
| SAG TEST @150° F. | 12.91 | | | 13.31 | | |
| Initial Mwt. Ppg | | | | | | |
| Bottom Mwt, ppg | 14.33 | | | 14.33 | | |
| Top Mwt, ppg | 12.03 | | | 12.42 | | |
| VST, ppg | 1.42 | | | 1.02 | | |

| Mud Properties | Mud G | | | Mud G' (25 ppb OCMA clay) | | |
|---|---|---|---|---|---|---|
| Heat aging Temp. ° F. | 150 | | | 150 | | |
| Heat Aging Time Hrs. | 16 | | | 16 | | |
| Static/Rolling | Rolling | | | Rolling | | |
| Mud Weight, ppg | 13.0 | | | 13.0 | | |
| Synthetic/Water Ratio | 75/25 | | | 75/25 | | |
| Rheo Temp, ° F | 40 | 100 | 150 | 40 | 100 | 150 |
| 600 rpm | 163 | 77 | 55 | 170 | 91 | 72 |
| 300 rpm | 102 | 50 | 38 | 102 | 51 | 50 |
| 200 rpm | 78 | 37 | 28 | 79 | 46 | 42 |
| 100 rpm | 52 | 25 | 20 | 52 | 32 | 32 |
| 6 rpm | 18 | 13 | 13 | 18 | 17 | 20 |
| 3 rpm | 16 | 11 | 12 | 15 | 16 | 18 |
| PV, cps | 61 | 27 | 17 | 68 | 40 | 22 |
| YP, lbs/100 ft$^2$ | 41 | 23 | 21 | 34 | 11 | 28 |
| 10 Second Gel | 21 | 19 | 15 | 23 | 24 | 21 |
| 10 Minute Gel | 38 | 25 | 17 | 38 | 31 | 30 |
| Total HTHP@250° F., cc | | | | | | |
| E.S. @ 150° F., Volts | 823 | | | 1048 | | |
| SAG TEST @150° F. | 12.81 | | | 12.96 | | |
| Initial Mwt. Ppg | | | | | | |
| Bottom Mwt, ppg | 14.75 | | | 14.37 | | |
| Top Mwt, ppg | 11.37 | | | 11.33 | | |
| VST, ppg | 1.94 | | | 1.41 | | |

Upon review of the above data one of skill in the art should understand and appreciate that the above fluid formulations are suitable for drilling subterranean wells. Further it should be noted that in most cases no or very little syneresis or barite settling was observed after cooling down to room temperature.

Sediment Toxicity Testing:

To determine the toxicity score of the drilling fluid compositions of the present invention, the bioassays were conducted using previously referenced Static 10-Day Sediment Toxicity Test (STT) of the drilling base fluid. The toxicity score tests were conducted in accordance with the procedures in "Standard Guide for Conducting 10-day Static Sediment Toxicity Tests with Marine and Estuarine Amphipods," ASTM E 1367-92 & Appendix A of GMG290000. Synthetic seawater and natural sediment was used to culture *L. plumuloius* amphipods. The standard reference toxicant was potassium chloride was used without sediment to measure a 96-hour $LC_{50}$.

Six treatment concentrations were prepared with natural sediment, five of which contained the drilling fluid blend, and one negative control. The sediment was first sieved through 1000 and 500 micrometer sieves. The test concentrations were 1300, 2900, 6400, 14,300, and 31,700 milligrams of drilling fluid blend per kilogram of dry natural sediment. Eight hundred milliliters of each sample were prepared. Each sample was mixed for ten minutes with a hand-held mixer.

For the definitive test, five replicates with 20 *L. Plumulosus* were exposed to the natural sediment spiked with the base stock drilling fluid blend in the 5 samples above and the control. Each replicant contained approximately 150 milliliters of natural sediment and 600 milliliters 20 ppt overlying water. Treatments were kept in a dedicated environmental chamber with 14 hours of light and 10 hours of dark at 20° C. After 10 days, all five replicates at each treatment were terminated and final survival data recorded. At 24-hour intervals, temperature, DO, pH, and salinity were measured in each treatment. The test was also aerated. Initial 0-hour and 10-day dry weights and 0-hour lengths of representative test organisms were measured. The 10-day weight is from surviving concurrent control organisms.

A group of test samples using a reference $C_{16\text{-}18}$ internal olefin Synthetic Base Fluid (SBF) test was initiated concurrently in a separate aliquot of the same batch of natural sediment as above.

The following results are based on representative data:

Sediment Toxicity

Below represents the summary toxicity score data of three component blend and four component blend.

| Blend ($C_{16\text{--}18}$ IO #1/$C_{15\text{--}18}$ IO #2/ $C_{15\text{--}16}$ IO #3) | $LC_{50}$ of Reference | $LC_{50}$ of Blend | $LC_{50}$ for blend + K Factor | Pass/Fail Limit | Test ratio with K factor | Pass/Fail |
|---|---|---|---|---|---|---|
| 50/25/25 | 3157 | 7213 | 7844.4 | 1 | 0.4 | PASS |
| 25/50/25 | 3157 | 2975 | 3606.4 | 1 | 0.9 | PASS |
| 25/25/50 | 3157 | 2573 | 3204.4 | 1 | 1.0 | PASS |
| 30/70/0 | 3080 | 5747 | 6363 | 1 | 0.5 | PASS |
| 70/30/0 | 6207 | 9071 | 10312.4 | 1 | 0.6 | PASS |
| 60/0/40 | 3157 | 4950 | 5581.4 | 1 | 0.6 | PASS |
| 40/0/60 | 3157 | 2935 | 3566.4 | 1 | 0.9 | PASS |

| Blend ($C_{16\text{--}18}$ IO #1/$C_{15\text{--}18}$ IO #2/ $C_{15\text{--}16}$ IO #3/$C_{16}$ AO) | $LC_{50}$ of Reference | $LC_{50}$ of Blend | $LC_{50}$ for blend + K Factor | Pass/Fail Limit | Test ratio with K factor | Pass/Fail |
|---|---|---|---|---|---|---|
| 50/20/15/15 | 3299 | 3437 | 4096.8 | 1 | 0.8 | PASS |
| 50/30/10/10 | 3299 | 2558 | 3217.8 | 1 | 1.0 | PASS |
| 50/15/20/15 | 2139 | 3688 | 4115.8 | 1 | 0.5 | PASS |
| 50/10/30/10 | 3299 | 2598 | 3257.8 | 1 | 1.0 | PASS |
| 60/20/10/10 | 3299 | 2893 | 3552.8 | 1 | 0.9 | PASS |
| 40/20/20/20 | 3299 | 6053 | 6712.8 | 1 | 0.5 | PASS |
| 70/30/0/0 | 6207 | 9071 | 10312.4 | 1 | 0.6 | PASS |

Upon consideration, one of skill in the art should understand and appreciate that the fluids of the present invention meet the standard desired for sediment toxicity.

Biodegradability Testing:

The test protocol used for biodegradability tests is in Appendix 4 to Subpart A of Part 435—Protocol for the Determination of Biodegradation of Synthetic Base Fluids in a Marine Closed Bottle Test System: Summary of Modifications to ISO 11734:1995. Typically, tests were conducted at 29° C. in anaerobic conditions in a closed bottle using marine/estuarine sediment. Monitoring gas production due to microbial degradation of the test fluid assesses base fluid degradation rates. The biodegradation rate ratio is calculated using the following formula:

Biodegradation rate ratio=(% degradation of a reference base stock)/(% degradation of test base stock+4%)

To pass the test, the biodegradation rate ratio should be ≦1.0

The following table contains the representative results of the biodegradation tests of the individual components as well as the blends of the blends in the present invention.

| Blend ($C_{16\text{--}18}$ IO #1/$C_{15\text{--}18}$ IO #2/ $C_{15\text{--}16}$ IO #3) | Reference Material degradation | Test Material degradation | Regulatory Limit | Test Ratio for all data included | Pass/Fail |
|---|---|---|---|---|---|
| 50/25/25 | 52.80 | 53.27 | ≦1.0 | 0.9 | Pass |
| 25/50/25 | 52.80 | 59.52 | ≦1.0 | 0.8 | Pass |
| 25/25/50 | 52.80 | 59.40 | ≦1.0 | 0.8 | Pass |
| 30/70/0 | 52.80 | 61.30 | ≦1.0 | 0.8 | Pass |
| 70/30/0 | 52.80 | 52.04 | ≦1.0 | 0.9 | Pass |
| 60/0/40 | 52.80 | 55.40 | ≦1.0 | 0.9 | Pass |
| 40/0/60 | 52.80 | 61.40 | ≦1.0 | 0.8 | Pass |

| Blend ($C_{16\text{--}18}$ IO #1/$C_{15\text{--}18}$ IO #2/ $C_{15\text{--}16}$ IO #3/ $C_{16}$ AO) | Reference Material degradation | Test Material degradation | Regulatory Limit | Test Ratio for all data included | Pass/Fail |
|---|---|---|---|---|---|
| 50/20/15/15 | 40.32 | 58.63 | ≦1.0 | 0.6 | Pass |
| 50/30/10/10 | 40.32 | 58.23 | ≦1.0 | 0.6 | Pass |
| 50/15/20/15 | 40.32 | 56.50 | ≦1.0 | 0.7 | Pass |
| 50/10/30/10 | 40.32 | 52.55 | ≦1.0 | 0.7 | Pass |
| 60/20/10/10 | 40.32 | 54.91 | ≦1.0 | 0.7 | Pass |
| 40/20/20/20 | 40.32 | 54.91 | ≦1.0 | 0.7 | Pass |
| 70/30/0/0 | 52.8 | 52.0 | ≦1.0 | 1.0 | Pass |

Upon consideration, one of skill in the art should understand and appreciate that the fluids of the present invention meet the standard desired for biodegradability.

In view of the above disclosure, one of skill in the art should understand and appreciate that one illustrative embodiment of the present invention includes a first synthetic internal olefin fraction having from 16 to 18 carbon atoms ($C_{16\text{-}18}$ IO), a second synthetic internal olefin fraction having between 15 to 18 carbon atoms ($C_{15\text{-}18}$ IO), and a third synthetic internal olefin fraction having 15 to 16 carbon atoms ($C_{15\text{-}16}$ IO). As the term is used in this disclosure a $C_{16\text{-}18}$ IO is defined as having a $C_{16}$ isomer content of greater than 50% w/w and a $C_{18}$ isomer content greater than 30% w/w. As the term is used in this disclosure a $C_{15\text{-}18}$ IO is defined as having a $C_{15}$ isomer content of greater than 20% w/w; a $C_{16}$ isomer content greater than 20%; a $C_{17}$ isomer content greater than 20%; and a $C_{18}$ isomer content greater than 15% w/w. As the term is used in this disclosure a $C_{15\text{-}16}$ IO is defined as having a $C_{15}$ isomer content of greater than 40% w/w and a $C_{16}$ isomer content greater than 40% w/w. As the term is used in this disclosure a $C_{16}$ alpha olefin is defined as having a $C_{16}$ isomer content of greater than 90% w/w. As indicated above the fluid may contain a mixture of isomers so long as the content of the other isomers does not exceed those of the isomers that define the fluid. The components of the illustrative wellbore fluid are blended such that the desired characteristics of toxicity and biodegrability are balance to achieve compliance with environmental requirements for hydrocarbon based drilling fluids. One such illustrative embodiment achieves this result by utilizing a formulation in which the first internal olefin is present in a range of about 40 to about 60 percent by weight of the wellbore fluid and wherein the second internal olefin is present in range of about 15 to about 40 percent by weight of the wellbore fluid and wherein the third olefin is present in range of about 10 to about 30 percent by weight of the wellbore fluid. Optionally, the illustrative fluid can include a $C_{16}$ alpha olefin. In such instances, the $C_{16}$ alpha olefin is present in the range of about 10 to about 20 percent by weight of the wellbore fluid. A person of skill in the art should understand and appreciate that the illustrative wellbore fluid may further include a non-oleaginous phase, typically as an internal phase. By doing so a non-aqueous drilling fluid is preferably formed. When included the non-oleaginous phase constitutes from about 1% to about 70% by volume of said fluid. Such a non-oleaginous phase may be selected from fresh water, seawater, a brine containing organic or inorganic dissolved salts, a liquid containing water-miscible organic compounds, and combinations thereof. The fluids of the present invention may further contain additional components depending upon the end use of the non-aqueous drilling fluid so long as they do not adversely impact the toxicity and biodegradability of the fluids or other permit considerations described herein. For example, alkali reserve, wetting agents, organophillic clays, viscosifiers, weighting agents, bridging agents and fluid loss control agents may be added to the fluid compositions of this invention for additional functional properties. The addition of such agents should be well known to one of skill in the art of formulating drilling fluids and muds. When included the weighting agent is selected from the group including calcium carbonate, dolomite, siderite, barite, celestite, iron oxides, manganese oxides, ulexite, carnalite, sodium chloride and combinations thereof and similar such weighting agents known in the art.

Alternatively, the present invention is considered to be a method of formulating the continuous phase of a hydrocarbon based drilling fluid. Specifically, in one illustrative core blend embodiment a first synthetic internal olefin fraction having from 16 to 18 carbon atoms ($C_{16-18}$ IO), a second synthetic internal olefin fraction having between 15 to 18 carbon atoms ($C_{15-18}$ IO), and a third synthetic internal olefin fraction having 15 to 16 carbon atoms ($C_{15-16}$ IO) has been found to consistently meet the environmental standards for use in the Gulf of Mexico. This consistency of passing the toxicity and biodegradation tests provides a higher level of compliance assurance in contrast to the performance of the individual products which suffer greater variability due to testing artifacts and manufacturing inconsistencies. In another illustrative core blend embodiment, a first synthetic internal olefin fraction having from 16 to 18 carbon atoms ($C_{16-18}$ IO), a second synthetic internal olefin fraction having between 15 to 18 carbon atoms ($C_{15-18}$ IO), a third synthetic internal olefin fraction having 15 to 16 carbon atoms ($C_{15-16}$ IO) and a $C_{16}$ alpha olefin has been found to consistently meet the environmental standards for use in the Gulf of Mexico and Effluent Limitation Guidelines. This results in an oleaginous fluid having a balance of toxicity and biodegradability properties as well as meeting the PAH limitations required by the Effluent Limitation Guidelines and the general permits including GMG290000. Specifically, in the second illustrative core blend embodiment a mixture of a synthetic $C_{16}$–$C_{18}$ internal olefin fraction; a synthetic $C_{15}$–$C_{18}$ internal olefin fraction; a synthetic $C_{15}$–$C_{16}$ internal olefin fraction and a $C_{16}$ alpha olefin has been found to consistently meet the environmental standards for use in the Gulf of Mexico. This consistency of passing the toxicity and biodegradation tests provides a higher level of compliance assurance in contrast to the performance of the individual products which suffer greater variability due to testing artifacts and manufacturing inconsistencies.

One of skill in the art should also appreciate and understand that the present invention includes as an illustrative embodiment a method of drilling a subterranean well. Such an illustrative embodiment includes attaching a cutting bit to a length of drill pipe, rotating said cutting bit, removing cuttings from around said bit with a drilling fluid. The illustrative method utilizes a wellbore fluid as is substantially disclosed herein. In a preferred embodiment, the wellbore fluid includes a first synthetic internal olefin fraction having from 16 to 18 carbon atoms ($C_{16-18}$ IO), a second synthetic internal olefin fraction having between 15 to 18 carbon atoms ($C_{15-18}$ IO), and a third synthetic internal olefin fraction having 15 to 16 carbon atoms ($C_{15-16}$ IO). Optionally the wellbore fluid may include an alpha olefin having 16 carbon atoms ($C_{16}$ AO).

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A biodegradable wellbore fluid comprising a blend of synthetic internal olefins and a rheology control agent, wherein the blend of synthetic internal olefins consists of: a first internal olefin fraction ($C_{16/18}$) having a $C_{16}$ isomer content of greater than 50% w/w and a $C_{18}$ isomer content greater than 30% w/w; a second internal olefin fraction ($C_{15/18}$) having a $C_{15}$ isomer content of greater than 20% w/w; a $C_{16}$ isomer content greater than 20%; a $C_{17}$ isomer content greater than 20%; and a $C_{18}$ isomer content greater than 15% w/w; and a third internal olefin fraction ($C_{15/16}$) having a $C_{15}$ isomer content of greater than 40% w/w and a $C_{16}$ isomer content greater than 40% w/w.

2. The wellbore fluid of claim 1 wherein the first internal olefin fraction is present in a range of about 40 to about 60 percent by weight of the wellbore fluid and wherein the second internal olefin fraction is present in range of about 15 to about 40 percent by weight of the wellbore fluid and wherein the third olefin fraction is present in range of about 10 to about 30 percent by weight of the wellbore fluid.

3. The wellbore fluid of claim 1 further comprising a $C_{16}$ alpha olefin ($C_{16}$ AO).

4. The wellbore fluid of claim 3 wherein the $C_{16}$ alpha olefin ($C_{16}$ AO) is present in the range of about 10 to about 20 percent by weight of the wellbore fluid.

5. The wellbore fluid of claim 1 further comprising a non-oleaginous phase.

6. The wellbore fluid of claim 5 wherein said non-oleaginous phase comprises from about 1% to about 70% by volume of said fluid.

7. The fluid of claim 6 wherein said non-oleaginous phase is selected from the group consisting of fresh water, seawater, a brine containing organic or inorganic dissolved salts, a liquid containing water-miscible organic compounds, and combinations thereof.

8. The wellbore fluid of claim 1 further comprising a weighting agent, wherein the weighting agent is selected from the group consisting of calcium carbonate, dolomite, siderite, barite, celestite, iron oxides, manganese oxides, ulexite, carnalite, sodium chloride and combinations thereof.

9. A method of formulating a wellbore fluid, the method comprising blending a mixture of synthetic internal olefin fractions and a rheology control agent, wherein the blend of synthetic internal olefin fractions consists of: a first internal olefin fraction ($C_{16/18}$) having a $C_{16}$ isomer content of greater than 50% w/w and a $C_{18}$ isomer content greater than 30% w/w; a second internal olefin fraction ($C_{15/16}$) having a $C_{15}$ isomer content of greater than 20% w/w; a $C_{16}$ isomer content greater than 20%; a $C_{17}$ isomer content greater than 20%; and a $C_{18}$ isomer content greater than 15% w/w; and a third internal olefin fraction ($C_{15/16}$) having a $C_{15}$ isomer content of greater than 40% w/w and a $C_{16}$ isomer content greater than 40% w/w., the mixture of the three olefin fractions forming the continuous phase of said wellbore fluid;

mixing said continuous phase with a discontinuous phase comprising a non-oleaginous liquid; and, adjusting the density of the well bore fluid by adding a weighting agent, wherein the weighting agent is selected from the group consisting of calcium carbonate, dolomite, siderite, barite, celestite, iron oxides, manganese oxides, ulexite, carnalite, sodium chloride and combinations thereof.

10. The method of claim 9 further comprising blending an alpha olefin having 16 carbon atoms with the continuous phase of said wellbore fluid.

11. A method of drilling a well comprising, attaching a cutting bit to a length of drill pipe, rotating said cutting bit, removing cuttings from around said bit with a drilling fluid wherein the drilling fluid is a biodegradable wellbore fluid which comprises a mixture of synthetic internal olefin fractions and a rheology control agent, wherein the blend of synthetic internal olefin fractions consists of: a first internal olefin fraction ($C_{16/18}$) having a $C_{16}$ isomer content of greater than 50% w/w and a $C_{18}$ isomer content greater than 30% w/w; a second internal olefin fraction ($C_{15/18}$) having a $C_{15}$ isomer content of greater than 20% w/w; a $C_{16}$ isomer content greater than 20%; a $C_{17}$ isomer content greater than 20%; and a $C_{18}$ isomer content greater than 15% w/w; and a third internal olefin fraction ($C_{15/16}$) having a $C_{15}$ isomer content of greater than 40% w/w and a $C_{16}$ isomer content greater than 40% w/w., the combination of the three olefin fractions forming the continuous phase of said wellbore fluid.

12. The method of claim 11, wherein the well bore fluid further comprises an alpha olefin having 16 carbon atoms with the continuous phase of said wellbore fluid.

13. The method of claim 11, wherein the wellbore fluid is further comprised of a discontinuous phase comprising a non-oleaginous liquid; and, a weighting agent, wherein the weighting agent is selected from the group consisting of calcium carbonate, dolomite, siderite, barite, celestite, iron oxides, manganese oxides, ulexite, carnalite, sodium chloride and combinations thereof.

* * * * *